United States Patent

Moskovich

[11] Patent Number: 6,025,959
[45] Date of Patent: Feb. 15, 2000

[54] COLOR CORRECTED PROJECTION LENSES FOR USE WITH CURVED FACEPLATE CATHODE RAY TUBES

[75] Inventor: Jacob Moskovich, Cincinnati, Ohio

[73] Assignee: U.S. Precision Lens Inc., Cincinnati, Ohio

[21] Appl. No.: 09/005,916

[22] Filed: Jan. 12, 1998

Related U.S. Application Data

[60] Provisional application No. 60/034,932, Jan. 13, 1997.

[51] Int. Cl.[7] .............................. G02B 13/18; G02B 9/64
[52] U.S. Cl. .......................... 359/649; 359/708; 359/713
[58] Field of Search .................................... 359/649, 650, 359/651, 708, 713

[56] References Cited

U.S. PATENT DOCUMENTS

| | | | |
|---|---|---|---|
| 4,815,831 | 3/1989 | Betensky | 359/649 |
| 4,900,139 | 2/1990 | Kreitzer | 359/649 |
| 4,963,007 | 10/1990 | Moskovich | 359/649 |
| 5,055,922 | 10/1991 | Wessling | 358/60 |
| 5,130,850 | 7/1992 | Toide | 359/649 |
| 5,237,456 | 8/1993 | Yoshioka | 359/649 |
| 5,309,283 | 5/1994 | Kreitzer | 359/649 |
| 5,329,363 | 7/1994 | Moskovich | 359/649 |
| 5,404,246 | 4/1995 | Kaneko et al. | 359/649 |
| 5,455,713 | 10/1995 | Kreitzer | 359/649 |

FOREIGN PATENT DOCUMENTS

0 764 865   3/1997   European Pat. Off. .

*Primary Examiner*—Scott J. Sugarman
*Attorney, Agent, or Firm*—Maurice M. Klee

[57] ABSTRACT

A projection television system (10) is provided which has a CRT (16) with a curved faceplate and a projection lens system (13) for forming an image on a screen (14). The projection lens system (13) is characterized by a power lens unit (U2) which (a) provides color correction for the lens system and (b) has two positive lens elements and a negative lens element with one of said positive lens elements ($L_P$) being at the image side of the unit. The positive lens element ($L_P$) at the image side of the second lens unit (U2) is preferably the strongest positive lens element in the lens system, having a focal length ($f_P$) which is less than 1.5 times the focal length of the system ($f_o$).

7 Claims, 6 Drawing Sheets

COLOR CORRECTED PROJECTION LENSES FOR USE WITH CURVED FACEPLATE CATHODE RAY TUBES

CROSS REFERENCE TO RELATED PROVISIONAL APPLICATION

This application claims the benefit under 35 USC §119(e) of U.S. Provisional Application Ser. No. 60/034,932 filed Jan. 13, 1997, which is hereby incorporated by reference.

FIELD OF THE INVENTION

This invention relates to projection lens systems for use in projection televisions and, in particular, to color corrected, wide field of view, high numerical aperture projection lens systems for use with cathode ray tubes (CRTs) having curved faceplates.

BACKGROUND OF THE INVENTION

Various color-corrected high image quality lenses for use in high definition TV displays (HDTV) and in the projection of data and graphics are known in the art. These lenses are most frequently used in "front screen" two piece systems, i.e. systems where the projector and the screen are two different units. As a result of the long distance between the projector and the screen, most of the lenses used in such systems have a half field of view of under 30°.

In recent years, one piece projection TVs have become increasingly popular. These systems utilize a "rear screen" configuration in which the image is projected onto the rear surface of a translucent screen which is combined with the projector into a single unit. To achieve a small overall size for such systems, the lens must have a field of view as wide as possible.

To help achieve this goal and to provide for an increased amount of light at the outer portions of the image, CRTs having curved faceplates are most often used in this application. The faceplates of such CRTs are plano-convex shaped with the phosphor being deposited onto the curved side of the faceplate. As a result, the outer portion of the phosphor side of the faceplate curves towards the lens.

Presenting the CRT image on a surface concave towards the projection lens allows the lens to achieve a half field of view in excess of 40° and, in some cases, in excess of 45°. However the control of electron beam spot size on a curved phosphor surface is much more difficult than on a flat surface. Spot size control is important since a small and well controlled spot size is required to produce a high quality image.

As long as spot size was fairly large, projection lenses did not need to be corrected for axial color. However, since the introduction of digital TV (e.g., satellite TV and DVD), the quality level of one piece rear projection TV sets for consumer use has been significantly raised.

Manufacturers of such systems are now more willing to use more complicated electronics to minimize and control the size of the spot on a curved phosphor surface, e.g., they are willing to produce spot sizes whose sizes are 0.15 millimeters or less. Consequently, new high quality wide field of view large aperture lenses are needed to compliment the higher quality outputs of curved phosphor CRTs. As with the optics used in data and graphics projection TV systems, these new lenses need to be corrected for color.

A typical color corrected lens used with a flat faceplate CRT consists from long conjugate to short of a front weak aspherical unit, a main power unit which includes a color correcting doublet and a strong positive element having most of the power of the lens, a corrector unit following the main power unit and having at least one aspherical surface, and a strong negative power unit associated with the CRT faceplate and providing most of the correction for the field curvature of the lens.

From the image side, the main power unit typically has a negative element followed by a positive element of similar focal length but of opposite sign. These two elements provide color correction for the lens and their combined shape is typically meniscus towards the long conjugate. The single positive element providing most of the power of the lens usually follows the color correcting doublet.

In accordance with the present invention, it has been found that when the CRT faceplate is curved, the simultaneous correction of chromatic and monochromatic aberrations using commonly available glass is difficult to achieve when the leading element in the color correcting arrangement is negative and the overall shape of the color correcting doublet is meniscus towards the long conjugate of the lens. In particular, it has been found that the correction of lateral color is not good enough to obtain a sufficiently high level of image quality.

SUMMARY OF THE INVENTION

In view of the foregoing, it is an object of the present invention to provide a projection lens system which (1) has a large aperture, i.e., a f/number of about 1.2 or less, (2) has a wide field of view, i.e., a half field of view of at least 35°, and (3) provides a high level of correction of both chromatic and monochromatic aberrations when used with a curved phosphor CRT faceplate.

To achieve these and other objects, the invention provides a projection lens system which from long conjugate to short comprises a front lens unit (first lens unit; U1) comprising at least one aspherical element, a positive power lens unit (second lens unit; U2) providing most of the power of the lens system as well as correction of chromatic aberrations, a corrector lens unit ($U_{CR}$) comprising at least one aspherical element, and a strong negative power unit (third lens unit; U3) associated with the CRT faceplate having a strong concave surface facing the long conjugate and providing most of the correction of the field curvature of the lens. The positive power lens units of the invention are characterized in that they always have a positive element ($L_P$) on the long conjugate side of the unit.

The foregoing drawings, which are incorporated in and constitute part of the specification, illustrate preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The lens systems of the invention preferably include a first lens unit, a second lens unit, a third lens unit, and a corrector lens unit wherein: 1) the first lens unit includes at least one aspherical surface; 2) the second lens unit (a) has a positive lens element at its long conjugate side, (b) provides color correction, and (c) has a strong positive optical power; 3) the third lens unit corrects for the field curvature of the lens system and has a relatively strong negative optical power; and 4) the corrector lens unit provides correction for, among other things, aberrations due to off-axis rays and has a relatively weak optical power.

The first lens unit serves to correct aperture type aberrations including spherical aberration and coma. As illustrated by the examples presented below, this unit can be composed of one or more lens elements. Preferably, the elements of this unit are composed of a plastic material.

The second lens unit preferably provides the majority of the lens system's positive optical power. This unit preferably includes three lens elements, namely, a positive first lens element preferably composed of glass, a second lens element preferably composed of glass which is preferably negative, but may also be positive, and a third lens element preferably composed of glass which has a power opposite to that of the second lens element. The first lens element of this unit is preferably the strongest positive lens element of the system and will be referred to hereinafter as the "positive power lens element." The second and third lens elements of this unit have appropriate optical dispersions and powers to provide axial color correction for the lens system.

The corrector unit and third lens unit serve to correct off-axis aperture dependent aberrations and field dependent aberrations, respectively. In particular, the corrector unit is effective in dealing with oblique spherical aberrations, while the third lens unit is effective in reducing the system's field curvature.

As illustrated by the examples presented below, the corrector lens unit can be composed of one or more lens elements. Preferably, the elements of this unit are composed of a plastic material.

The third lens unit is preferably composed of an aspherical plastic lens element which contacts the fluid which couples the lens system to the faceplate of the CRT. If desired, the aspherical plastic lens element of the third lens unit can include an absorptive color filter material in accordance with Wessling, U.S. Pat. No. 5,055,922.

Quantitatively, the ratio of the absolute value of the focal length ($f_1$) of the first lens unit to the overall focal length ($f_0$) of the projection lens is preferably greater than 2.5; the ratio of the focal length ($f_2$) of the second lens unit to the overall focal length of the projection lens is preferably less than 1.5; the ratio of the absolute value of the focal length ($f_{CR}$) of the corrector lens unit to the overall focal length of the projection lens is preferably greater than 2.0; and the ratio of the absolute value of the focal length ($f_3$) of the third lens unit to the overall focal length of the projection lens is preferably less than 2.5. The ratio of the focal length ($f_P$) of the positive power lens element of the second lens unit to the overall focal length of the projection lens is preferably less than 1.5.

FIGS. 1–5 illustrate various projection lenses constructed in accordance with the invention. Corresponding prescriptions appear in Tables 1–5. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation $$z = \frac{cy^2}{1+[1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–5.

The designation "a" associated with various surfaces in the tables represents an aspheric surface, i.e., a surface for which at least one of D, E, F, G, H, or I in the above equation is not zero. The designation "c" represents a conic surface, i.e., a surface for which k in the above equation is not zero. All dimensions given in the tables are in millimeters. The tables are constructed on the assumption that light travels from left to right in the figures. In actual practice, the viewing screen will be on the left and the CRT will be on the right, and light will travel from right to left.

Figure 1:
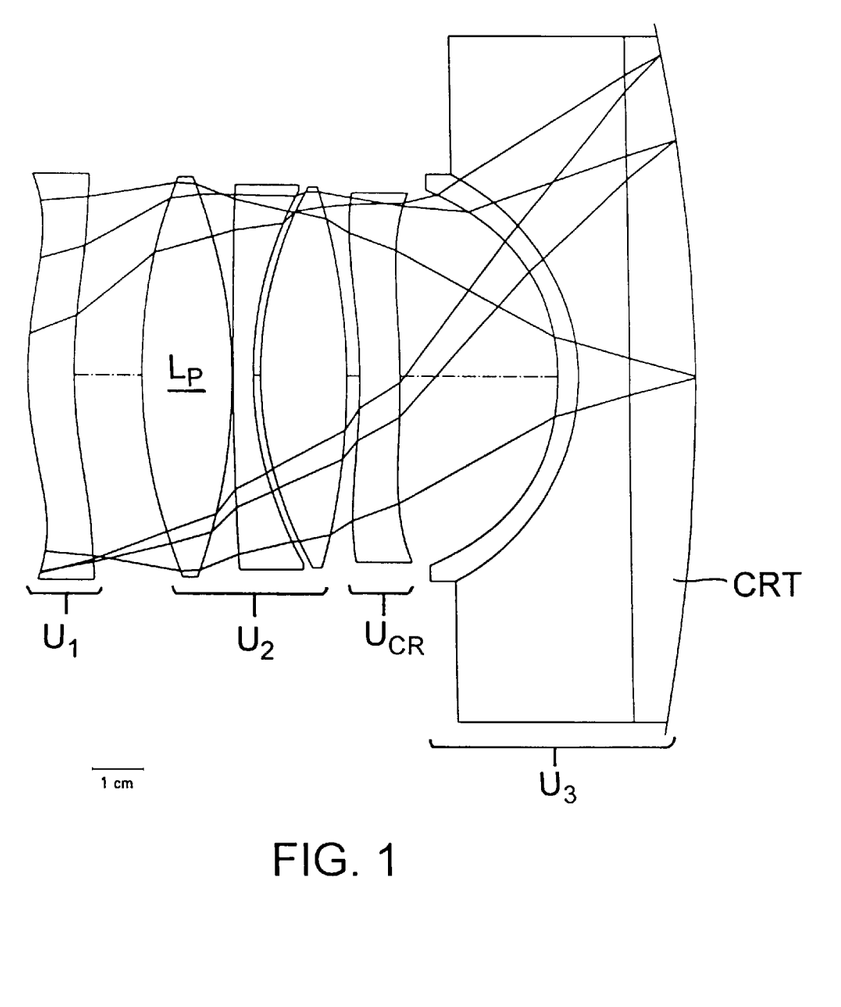
FIGS. 1–5 are schematic side views of lens systems constructed in accordance with the invention.
Figure 2:
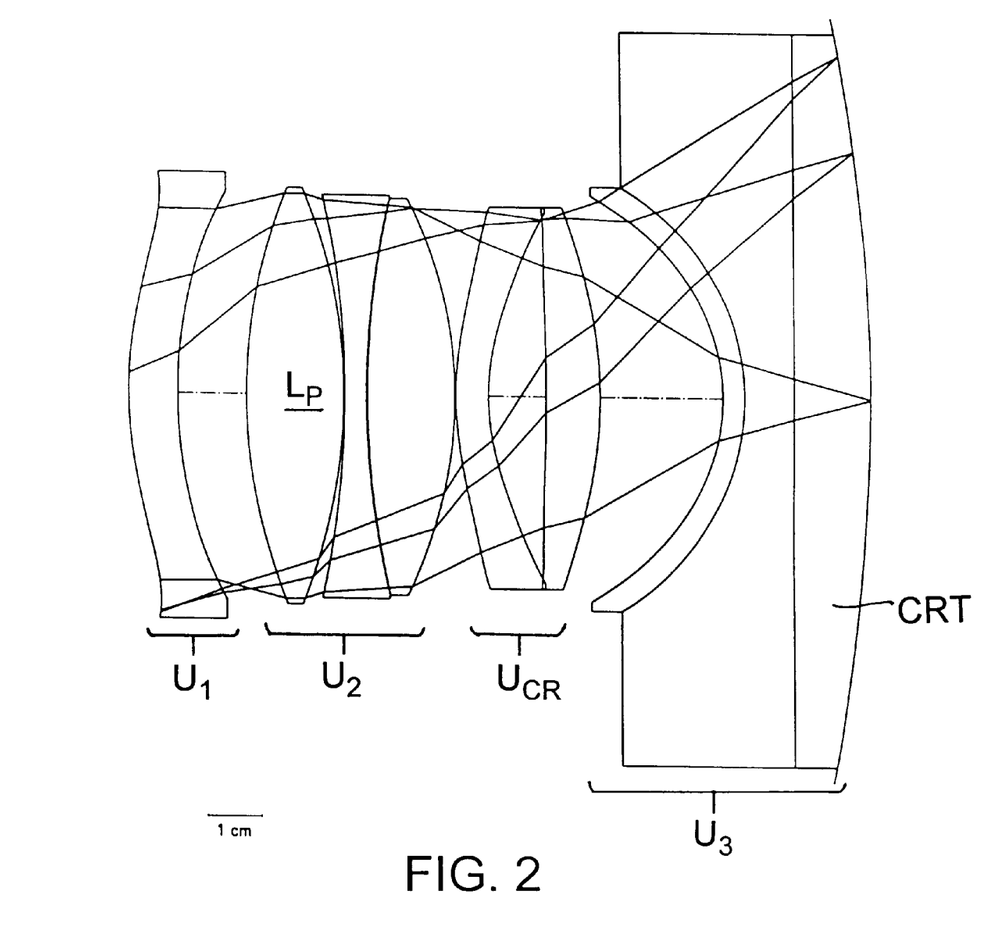
Figure 3:
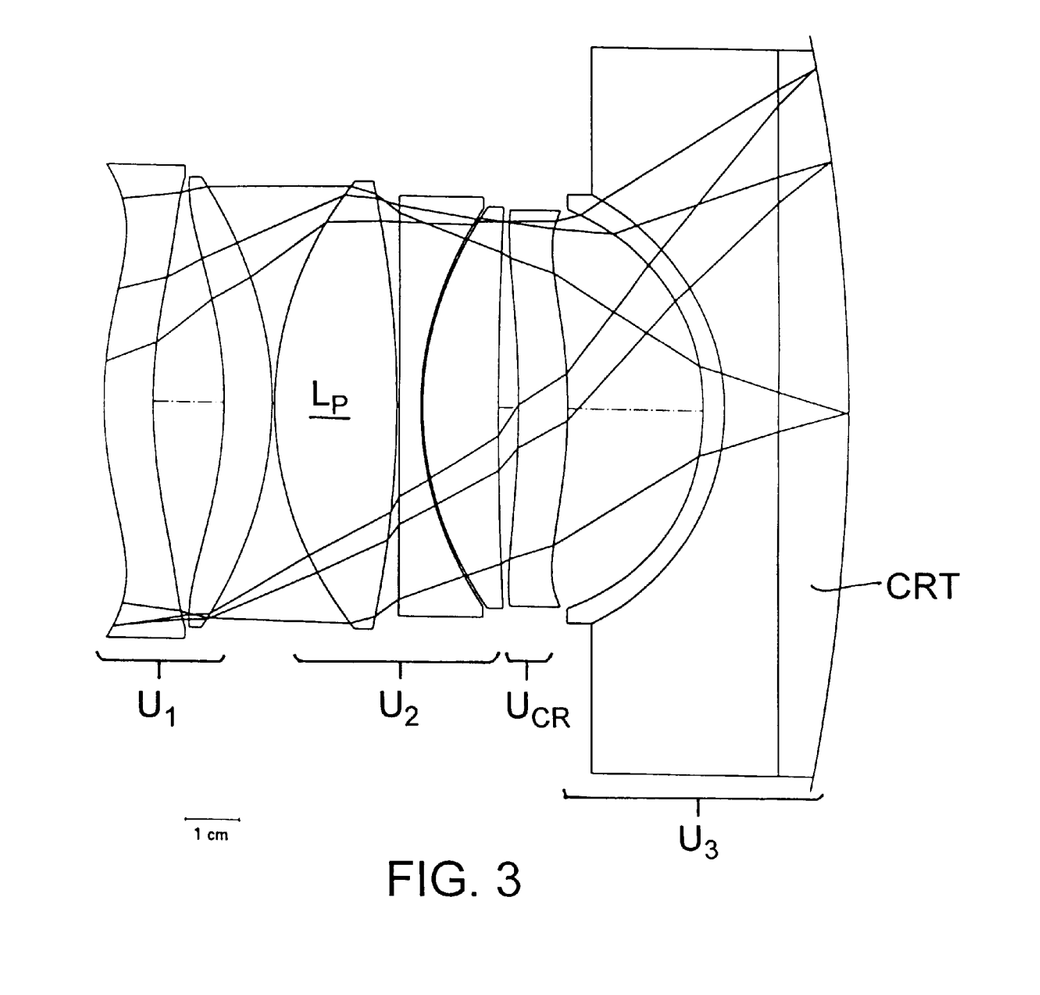
Figure 4:
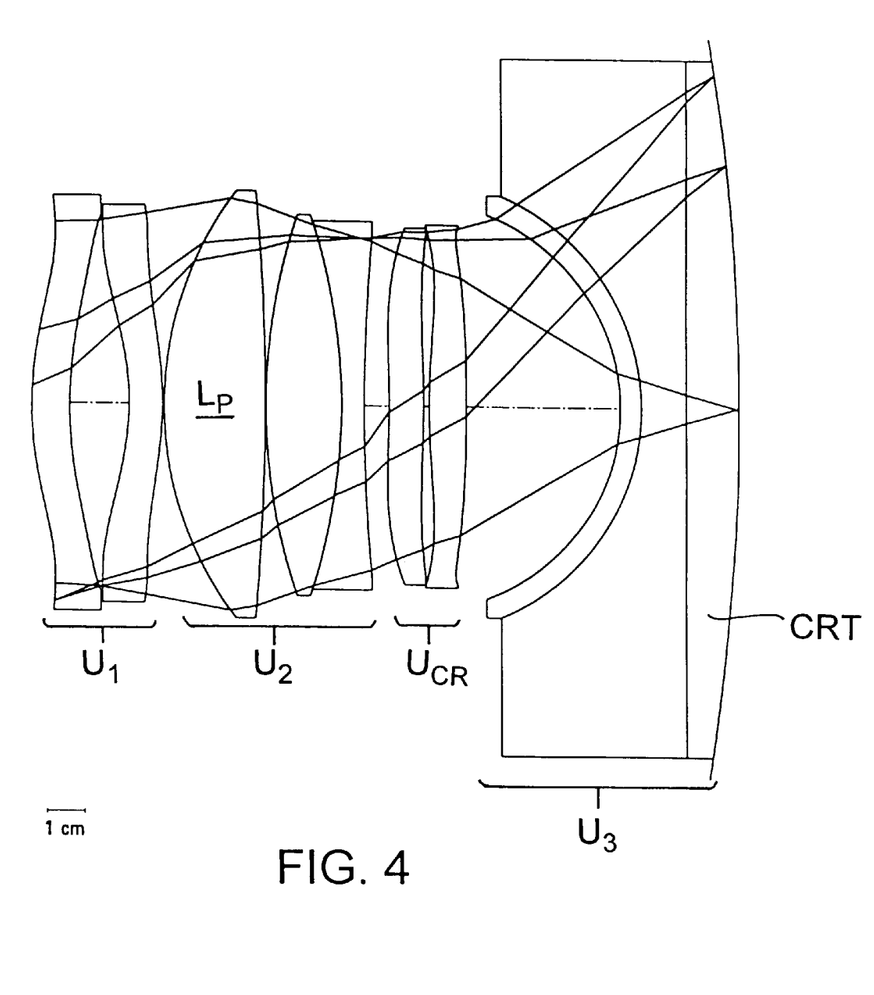
Figure 5:
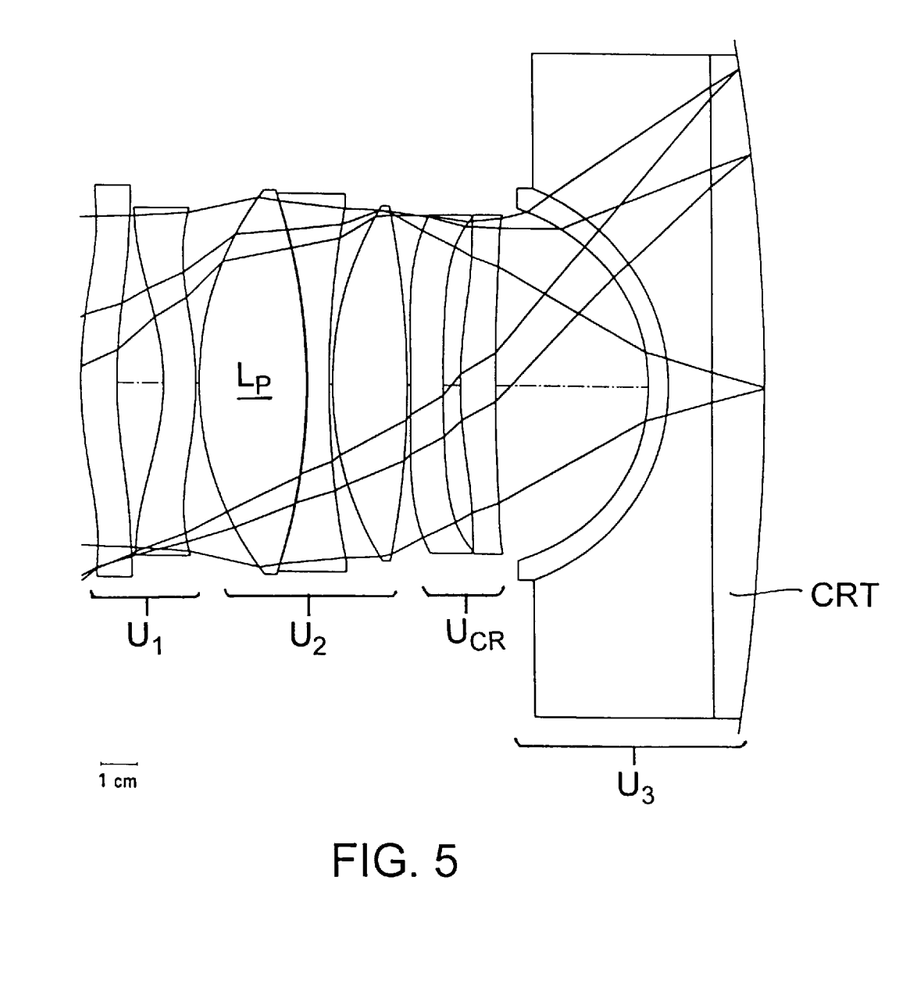

The CRT faceplate constitutes surfaces 13–14 in FIG. 1, surfaces 15–16 in FIGS. 2 and 3, and surfaces 17–18 in FIGS. 4 and 5. A coupling fluid is located between surfaces 12–13 in FIG. 1, surfaces 14–15 in FIGS. 2 and 3, and surfaces 16–17 in FIGS. 4 and 5. The material designations for these components are set forth as six digit numbers in the tables, where a $N_e$ value for the material is obtained by adding 1,000 to the first three digits of the designation, and a $V_e$ value is obtained from the last three digits by placing a decimal point before the last digit.

In Table 1, the first lens unit comprises surfaces 1–2, the second lens unit comprises surfaces 3–8, the corrector lens unit comprises surfaces 9–10, and the third lens unit comprises surfaces 11–14.

In Table 2, the first lens unit comprises surfaces 1–2, the second lens unit comprises surfaces 3–8, the corrector lens unit comprises surfaces 9–12, and the third lens unit comprises surfaces 13–16.

In Table 3, the first lens unit comprises surfaces 1–4, the second lens unit comprises surfaces 5–10, the corrector lens unit comprises surfaces 11–12, and the third lens unit comprises surfaces 13–16.

In Tables 4 and 5, the first lens unit comprises surfaces 1–4, the second lens unit comprises surfaces 5–10, the corrector lens unit comprises surfaces 11–14, and the third lens unit comprises surfaces 15–18.

Table 6 summarizes various properties of the lens systems of the invention. As shown therein, the lens systems of Tables 1–5 have the various preferred properties referred to above. In this table, the designation "½ w" represents the half field of view of the lens system. With regard to color correction, the lens systems of Tables 1–5 achieve levels of lateral color correction of less than 0.15 millimeters at the phosphor screen for wavelengths from 480 nanometers to 640 nanometers, i.e., they achieve a level of color correction better than the spot size used for digital TV images.

Figure 6:
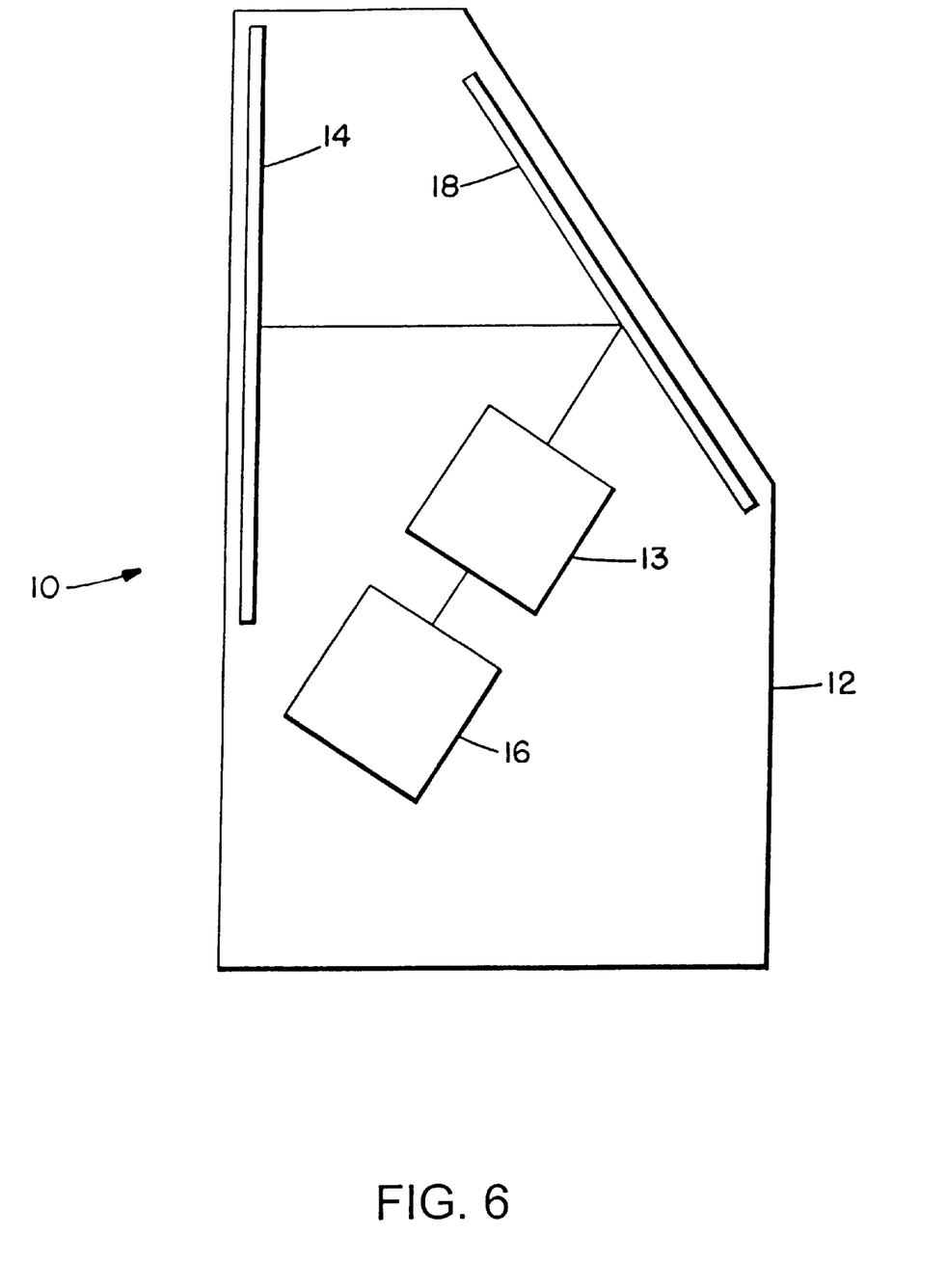
FIG. 6 is a schematic diagram of a rear projection TV employing a lens system constructed in accordance with the invention.

FIG. 6 is a schematic diagram of a CRT projection television 10 constructed in accordance with the invention. As shown in this figure, projection television 10 includes cabinet 12 having projection screen 14 along its front face and slanted mirror 18 along its back face. Module 13 schematically illustrates a lens system constructed in accordance with the invention and module 16 illustrates its associated CRT tube. In practice, three lens systems 13 and three CRT tubes 16 are used to project red, green, and blue images onto screen 14.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 75.9254 | 9.00000 | ACRYLIC | 77.98 |
| 2 | a | 104.3505 | 13.19380 | | 73.89 |
| 3 | | 103.5327 | 18.00000 | SK18 | 76.74 |
| 4 | | −109.7000 | 0.20000 | | 76.79 |
| 5 | | 763.8706 | 4.00000 | SF13 | 73.78 |
| 6 | | 75.6031 | 1.50000 | | 71.30 |
| 7 | | 76.0645 | 17.00000 | SK18 | 72.99 |
| 8 | | −136.7573 | 2.51497 | | 73.02 |
| 9 | a | −113.6070 | 8.00000 | ACRYLIC | 70.84 |
| 10 | a | −175.9901 | Space 1 | | 68.89 |
| 11 | a | −51.7837 | 4.00000 | ACRYLIC | 72.05 |
| 12 | | −45.0000 | 10.00000 | 423500 | 78.14 |
| 13 | | ∞ | 13.00000 | 560500 | 130.00 |
| 14 | | −350.0000 | Image distance | | 130.00 |

Symbol Description a - Polynomial asphere
Object and Image Surface

| Surface | Radius |
|---|---|
| Image | −350.0000 |

Even Polynomial Aspheres

| Surf. No. | D | E | F |
|---|---|---|---|
| 1 | −1.8029E − 06 | −1.7193E − 09 | −4.1653E − 13 |
| 2 | −6.2849E − 07 | −1.5207E − 09 | −9.7477E − 14 |
| 9 | 3.5440E − 06 | −1.5917E − 09 | 3.1581E − 12 |
| 10 | 3.1798E − 06 | 1.9390E − 09 | −6.2159E − 12 |
| 11 | −8.0531E − 06 | 1.6131E − 08 | −3.3448E − 11 |

| Surf. No. | G | H | I |
|---|---|---|---|
| 1 | 2.8754E − 16 | 2.7542E − 19 | −1.1474E − 22 |
| 2 | 2.5200E − 16 | 3.4831E − 19 | −1.6022E − 22 |
| 9 | −4.1931E − 15 | 2.5658E − 18 | −5.7526E − 22 |
| 10 | 8.6420E − 15 | −5.8716E − 18 | 1.5947E − 21 |
| 11 | 3.6979E − 14 | −2.1050E − 17 | 4.6654E − 21 |

TABLE 1-continued

Variable Spaces

| Zoom Pos. | Space 1 T(10) | Focal Shift | Image Distance |
|---|---|---|---|
| 1 | 31.031 | −0.681 | 0.000 |
| 2 | 30.366 | −0.337 | 0.000 |

First-Order Data

| | | |
|---|---|---|
| f/number | 1.24 | 1.23 |
| Magnification | −0.1167 | −0.1013 |
| Object Height | −584.20 | −673.10 |
| Object Distance | −731.56 | −835.05 |
| Effective Focal Length | 76.679 | 77.021 |
| Image Distance | 0.00 | 0.00 |
| Overall Length | 863.00 | 965.82 |
| Forward Vertex Distance | 131.44 | 130.77 |
| Barrel Length | 131.44 | 130.77 |
| Stop Surface Number | 3 | 3 |
| Distance to Stop | 4.70 | 4.70 |
| Stop Diameter | 76.829 | 76.300 |
| Entrance Pupil Distance | 24.312 | 24.312 |
| Exit Pupil Distance | −67.640 | −67.279 |

First Order Properties of Elements

| Element Number | Surface Numbers | | Power | f' |
|---|---|---|---|---|
| 1 | 1 | 2 | 0.19569E − 02 | 511.00 |
| 2 | 3 | 4 | 0.11643E − 01 | 85.891 |
| 3 | 5 | 6 | −0.88817E − 02 | −112.59 |
| 4 | 7 | 8 | 0.12711E − 01 | 78.675 |
| 5 | 9 | 10 | −0.14753E − 02 | −677.81 |
| 6 | 11 | 12 | 0.17176E − 02 | 582.20 |
| 7 | 12 | 13 | −0.94067E − 02 | −106.31 |
| 8 | 13 | 14 | 0.16000E − 02 | 625.00 |
| 6 | 8 | 11 | 14 | −0.60935E − 02 | −164.11 |

| Element Number | Surface Numbers | | lpp | l'pp |
|---|---|---|---|---|
| 1 | 1 | 2 | −14.568 | −20.023 |
| 2 | 3 | 4 | 5.5065 | −5.8346 |
| 3 | 5 | 6 | 2.5473 | 0.25212 |
| 4 | 7 | 8 | 3.8212 | −6.8702 |
| 5 | 9 | 10 | −10.185 | −15.777 |
| 6 | 11 | 12 | 17.107 | 14.866 |
| 7 | 12 | 13 | 0.33015E − 07 | −7.0259 |
| 8 | 13 | 14 | 8.3333 | 0.33458E − 06 |
| 6 | 8 | 11 | 14 | −5.4074 | −24.177 |

TABLE 2

| Surf. No. | Type | Radius | Thickness | Glass | Clear Aperture Diameter |
|---|---|---|---|---|---|
| 1 | a | 78.1234 | 9.00000 | ACRYLIC | 80.44 |
| 2 | ac | 95.7568 | 12.51433 | | 73.44 |
| 3 | | 100.9258 | 18.00000 | SK18 | 74.89 |
| 4 | | −100.9258 | 0.20000 | | 74.76 |
| 5 | | −170.2562 | 4.00000 | SF4 | 72.53 |
| 6 | | 156.9671 | 0.19835 | | 70.96 |
| 7 | | 162.8714 | 16.00000 | SK18 | 70.98 |
| 8 | | −82.6935 | 0.20000 | | 71.35 |
| 9 | a | 58.9473 | 6.00000 | ACRYLIC | 68.66 |
| 10 | a | 42.6679 | 10.59490 | | 66.58 |
| 11 | a | −351.9562 | 10.00000 | ACRYLIC | 66.63 |
| 12 | c | −79.5372 | Space 1 | | 68.70 |
| 13 | a | −40.0417 | 4.00000 | ACRYLIC | 73.08 |

TABLE 2-continued

| 14 | -45.0000 | 9.00000 | 423500 | 78.27 |
| 15 | ∞ | 14.10000 | 563500 | 130.00 |
| 16 | -350.0000 | Image distance | | 130.00 |

Symbol Description a - Polynomial asphere
c - Conic section

Object and Image Surface

| Surface | Radius |
|---|---|
| Image | -350.0000 |

Conics

| Surface Number | Constant |
|---|---|
| 2 | 2.3606E + 00 |
| 12 | -3.9930E + 00 |

Even Polynomial Aspheres

| Surf. No. | D | E | F |
|---|---|---|---|
| 1 | -8.8369E - 07 | -5.2235E - 10 | -2.4140E - 13 |
| 2 | 9.2707E - 08 | -4.8079E - 11 | 1.3624E - 14 |
| 9 | -6.4344E - 06 | 3.1413E - 09 | -4.3581E - 13 |
| 10 | -6.8817E - 06 | 4.6463E - 09 | -8.8108E - 12 |
| 11 | 1.7262E - 06 | -3.7483E - 09 | 1.0024E - 11 |
| 13 | -4.5889E - 06 | 1.6253E - 08 | -3.1557E - 11 |

| Surf. No. | G | H | I |
|---|---|---|---|
| 1 | 1.9448E - 16 | -1.4562E - 19 | 4.1180E - 23 |
| 2 | 8.0193E - 18 | -9.5624E - 22 | -2.8791E - 24 |
| 9 | -5.6950E - 16 | 1.2426E - 19 | 1.5610E - 22 |
| 10 | 1.3192E - 14 | -1.0078E - 17 | 2.8873E - 21 |
| 11 | -1.4338E - 14 | 1.0363E - 17 | -3.1241E - 21 |
| 13 | 3.6166E - 14 | -2.2102E - 17 | 5.6074E - 21 |

Variable Spaces

| Zoom Pos. | Space 1 T(12) | Focal Shift | Image Distance |
|---|---|---|---|
| 1 | 22.731 | -0.184 | 0.000 |
| 2 | 22.012 | 0.022 | 0.000 |

First-Order Data

| f/number | 1.24 | 1.23 |
|---|---|---|
| Magnification | -0.1167 | -0.1013 |
| Object Height | -584.20 | -673.10 |
| Object Distance | -726.46 | -831.18 |
| Effective Focal Length | 75.972 | 76.515 |
| Image Distance | -.10075E - 03 | -.10962E - 03 |
| Overall Length | 863.00 | 967.00 |
| Forward Vertex Distance | 136.54 | 135.82 |
| Barrel Length | 136.54 | 135.82 |
| Stop Surface Number | 3 | 3 |
| Distance to Stop | 14.41 | 14.41 |
| Stop Diameter | 74.623 | 74.260 |
| Entrance Pupil Distance | 30.585 | 30.585 |
| Exit Pupil Distance | -63.002 | -62.702 |

First Order Properties of Elements

| Element Number | Surface Numbers | | Power | f |
|---|---|---|---|---|
| 1 | 1 | 2 | 0.13603E - 02 | 735.15 |
| 2 | 3 | 4 | 0.12265E - 01 | 81.531 |
| 3 | 5 | 6 | -0.93753E - 02 | -106.66 |
| 4 | 7 | 8 | 0.11395E - 01 | 87.761 |
| 5 | 9 | 10 | -0.28066E - 02 | -356.30 |
| 6 | 11 | 12 | 0.48635E - 02 | 205.61 |
| 7 | 13 | 14 | -0.99642E - 03 | -1003.6 |
| 8 | | 14 | 15 | -0.94067E - 02 | -106.31 |
| 9 | | 15 | 16 | 0.16086E - 02 | 621.67 |
| 7 | 9 | 13 | 16 | -0.87876E - 02 | -113.80 |

| Element Number | Surface Numbers | | lpp | l'pp |
|---|---|---|---|---|
| 1 | 1 | 2 | -22.840 | -27.995 |
| 2 | 3 | 4 | 5.6815 | -5.6815 |
| 3 | 5 | 6 | 1.1752 | -1.0835 |
| 4 | 7 | 8 | 6.6346 | -3.3685 |
| 5 | 9 | 10 | 16.562 | 11.988 |
| 6 | 11 | 12 | 8.5453 | 1.9311 |
| 7 | 13 | 14 | -29.488 | -33.140 |
| 8 | 14 | 15 | 0.33015E - 07 | -6.3233 |
| 9 | 15 | 16 | 9.0211 | 0.66198E - 06 |
| 7 | 9 | 13 | 16 | -3.7644 | -22.465 |

TABLE 3

| Surf. No. | Type | Radius | Thickness | Glass | Clear Aperture Diameter |
|---|---|---|---|---|---|
| 1 | a | 75.3275 | 9.00000 | ACRYLIC | 85.75 |
| 2 | a | 101.5103 | 13.04334 | | 81.71 |
| 3 | a | -78.2772 | 9.00000 | ACRYLIC | 81.53 |
| 4 | a | -65.4519 | 0.50000 | | 81.19 |
| 5 | | 64.9785 | 22.70542 | BACD18 | 81.02 |
| 6 | | -199.5574 | 0.50000 | | 78.41 |
| 7 | | -10067.2405 | 4.00000 | FD10 | 76.03 |
| 8 | | 64.8920 | 0.40460 | | 72.14 |
| 9 | | 63.6521 | 14.00000 | SK5 | 72.64 |
| 10 | | 699.7213 | 3.77308 | | 71.97 |
| 11 | a | -206.2623 | 9.00000 | ACRYLIC | 71.69 |
| 12 | a | -101.9762 | Space 1 | | 70.02 |
| 13 | a | -50.2233 | 4.00000 | ACRYLIC | 72.23 |
| 14 | | -44.5060 | 10.00000 | 423500 | 77.60 |
| 15 | | ∞ | 13.00000 | 560500 | 130.00 |
| 16 | | -350.0000 | Image distance | | 130.00 |

Symbol Description a - Polynomial asphere

Object and Image Surface

| Surface | Radius |
|---|---|
| Image | -350.0000 |

Even Polynomial Aspheres

| Surf. No. | D | E | F |
|---|---|---|---|
| 1 | -1.4648E - 06 | -7.1777E - 10 | -8.2347E - 13 |
| 2 | -4.7680E - 07 | -6.5540E - 10 | -3.8711E - 13 |
| 3 | 1.0442E - 06 | 2.4385E - 10 | -3.8441E - 15 |
| 4 | 9.4890E - 07 | -4.6092E - 10 | 2.3843E - 13 |
| 11 | 2.8701E - 07 | -6.9913E - 10 | 2.9784E - 12 |
| 12 | 6.9145E - 07 | 2.8489E - 09 | -5.2728E - 12 |
| 13 | -5.0308E - 06 | 4.0069E - 09 | -3.3618E - 12 |

| Surf. No. | G | H | I |
|---|---|---|---|
| 1 | 8.2100E - 18 | 3.0400E - 19 | -7.5061E - 23 |
| 2 | 1.4985E - 16 | 2.7016E - 19 | -9.5863E - 23 |
| 3 | 8.5613E - 17 | 3.0480E - 20 | -2.1414E - 23 |
| 4 | -1.6869E - 17 | -4.2323E - 20 | 1.3611E - 23 |
| 11 | -3.4379E - 15 | 2.0972E - 18 | -5.2091E - 22 |
| 12 | 8.0919E - 15 | -5.6980E - 18 | 1.6113E - 21 |
| 13 | 6.1594E - 16 | 3.2548E - 19 | -2.9596E - 22 |

Variable Spaces

| Zoom Pos. | Space 1 T(12) | Focal Shift | Image Distance |
|---|---|---|---|

TABLE 3-continued

| | | | | |
|---|---|---|---|---|
| 1 | | 25.084 | −0.336 | −0.010 |
| 2 | | 24.416 | −0.089 | −0.010 |

First-Order Data

| | | |
|---|---|---|
| f/number | 1.14 | 1.13 |
| Magnification | −0.0935 | −0.0794 |
| Object Height | −730.00 | −860.00 |
| Object Distance | −911.87 | −1065.1 |
| Effective Focal Length | 78.321 | 78.691 |
| Image Distance | −.97413E − 02 | −.98614E − 02 |
| Overall Length | 1049.9 | 1202.4 |
| Forward Vertex Distance | 138.00 | 137.33 |
| Barrel Length | 138.01 | 137.34 |
| Stop Surface Number | 5 | 5 |
| Distance to Stop | 10.10 | 10.10 |
| Stop Diameter | 83.304 | 82.839 |
| Entrance Pupil Distance | 35.323 | 35.323 |
| Exit Pupil Distance | −63.176 | −62.798 |

First Order Properties of Elements

| Element Number | Surface Numbers | | Power | f |
|---|---|---|---|---|
| 1 | 1 | 2 | 0.18829E − 02 | 531.10 |
| 2 | 3 | 4 | 0.15228E − 02 | 656.70 |
| 3 | 5 | 6 | 0.12644E − 01 | 79.089 |
| 4 | 7 | 8 | −0.11391E − 01 | −87.790 |
| 5 | 9 | 10 | 0.85153E − 02 | 117.44 |
| 6 | 11 | 12 | 0.25180E − 02 | 397.14 |
| 7 | 13 | 14 | 0.15551E − 02 | 643.06 |
| 8 | 14 | 15 | −0.95111E − 02 | −105.14 |
| 9 | 15 | 16 | 0.16000E − 02 | 625.00 |
| 7 | 9 | 13 | 16 −0.63626E − 02 | −157.17 |

| Element Number | Surface Numbers | | lpp | l'pp |
|---|---|---|---|---|
| 1 | 1 | 2 | −15.565 | −20.976 |
| 2 | 3 | 4 | 29.849 | 24.958 |
| 3 | 5 | 6 | 3.5160 | −10.798 |
| 4 | 7 | 8 | 2.2912 | −0.14769E − 01 |
| 5 | 9 | 10 | −0.87320 | −9.5990 |
| 6 | 11 | 12 | 11.586 | 5.7281 |
| 7 | 13 | 14 | 19.104 | 16.930 |
| 8 | 14 | 15 | −0.34014E − 07 | −7.0259 |
| 9 | 15 | 16 | 8.3333 | 0.33458E − 06 |
| 7 | 9 | 13 | 16 −5.1858 | −23.948 |

TABLE 4

| Surf. No. | Type | Radius | Thickness | Glass | Clear Aperture Diameter |
|---|---|---|---|---|---|
| 1 | a | 90.0535 | 10.00000 | ACRYLIC | 105.96 |
| 2 | a | 102.8973 | 15.78776 | | 97.56 |
| 3 | a | −70.2250 | 9.00000 | ACRYLIC | 97.45 |
| 4 | a | −95.4074 | 0.50000 | | 101.18 |
| 5 | | 92.3723 | 27.00000 | SK18 | 109.04 |
| 6 | | −642.6984 | 0.20000 | | 106.50 |
| 7 | | 158.4645 | 20.00000 | SK18 | 98.88 |
| 8 | | −158.4645 | 0.06179 | | 95.59 |
| 9 | | −157.2990 | 6.00000 | SF6 | 95.55 |
| 10 | | 498.4189 | 6.57092 | | 89.55 |
| 11 | a | −372.6684 | 9.00000 | ACRYLIC | 92.35 |
| 12 | a | −395.7785 | 1.50000 | | 92.41 |
| 13 | a | 172.5227 | 10.00000 | ACRYLIC | 92.42 |
| 14 | a | −445.8306 | Space 1 | | 94.02 |
| 15 | a | −59.4571 | 5.60000 | ACRYLIC | 99.71 |
| 16 | | −60.5000 | 12.00000 | 430500 | 107.63 |
| 17 | | ∞ | 14.00000 | 565500 | 180.00 |
| 18 | | −600.0000 | Image distance | | 180.00 |

Symbol Description a - Polynomial asphere
Object and Image Surface

| Surface | Radius |
|---|---|
| Image | −599.9999 |

Even Polynomial Aspheres

| Surf. No. | D | E | F |
|---|---|---|---|
| 1 | −9.4817E − 07 | −1.0331E − 10 | −1.3133E − 13 |
| 2 | −6.9575E − 07 | −2.7955E − 10 | 2.6820E − 14 |
| 3 | 2.3978E − 06 | −8.0746E − 11 | −1.7129E − 14 |
| 4 | 2.2527E − 06 | −2.4454E − 10 | 3.9267E − 14 |
| 11 | 1.8502E − 06 | −1.5291E − 10 | −4.9911E − 14 |
| 12 | 7.5312E − 07 | 9.9338E − 11 | −7.2778E − 15 |
| 13 | −1.3285E − 06 | −3.6881E − 10 | 4.5883E − 13 |
| 14 | −1.6576E − 07 | 4.4703E − 10 | −1.1777E − 12 |
| 15 | −2.0474E − 06 | 1.8685E − 09 | −1.0171E − 12 |

| Surf. No. | G | H | I |
|---|---|---|---|
| 1 | 7.7524E − 18 | 2.2028E − 20 | −3.9483E − 24 |
| 2 | 2.6395E − 17 | 1.2925E − 20 | −4.2776E − 24 |
| 3 | 2.2515E − 17 | 3.9252E − 21 | −3.6813E − 24 |
| 4 | −8.9174E − 18 | −7.2170E − 21 | 1.0728E − 24 |
| 11 | 1.1640E − 17 | 5.4479E − 21 | −1.8530E − 24 |
| 12 | −6.3377E − 18 | −1.7516E − 21 | −2.6170E − 24 |
| 13 | −3.8744E − 16 | 1.6036E − 19 | −2.3489E − 23 |
| 14 | 9.4904E − 16 | −3.3734E − 19 | 5.1496E − 23 |
| 15 | 1.5162E − 16 | 6.1179E − 20 | −2.0252E − 23 |

Variable Spaces

| Zoom Pos. | Space 1 T(14) | Focal Shift | Image Distance |
|---|---|---|---|
| 1 | 40.761 | 0.936 | 0.000 |
| 2 | 40.092 | 1.143 | 0.000 |

First-Order Data

| | | |
|---|---|---|
| f/number | 1.17 | 1.16 |
| Magnification | −0.1035 | −0.0931 |
| Object Height | −914.40 | −1016.0 |
| Object Distance | −1076.0 | −1189.3 |
| Effective Focal Length | 100.80 | 101.25 |
| Image Distance | −.37074E − 03 | −.44262E − 03 |
| Overall Length | 1264.0 | 1376.6 |
| Forward Vertex Distance | 187.98 | 187.31 |
| Barrel Length | 187.98 | 187.31 |
| Stop Surface Number | 5 | 5 |
| Distance to Stop | 21.49 | 21.49 |
| Stop Diameter | 107.586 | 107.618 |
| Entrance Pupil Distance | 45.852 | 45.852 |
| Exit Pupil Distance | −80.038 | −79.740 |

First Order Properties of Elements

| Element Number | Surface Numbers | | Power | f |
|---|---|---|---|---|
| 1 | 1 | 2 | 0.86056E − 03 | 1162.0 |
| 2 | 3 | 4 | −0.16366E − 02 | −611.01 |
| 3 | 5 | 6 | 0.78262E − 02 | 127.78 |
| 4 | 7 | 8 | 0.78942E − 02 | 126.68 |
| 5 | 9 | 10 | −0.68246E − 02 | −146.53 |
| 6 | 11 | 12 | −0.67408E − 04 | −14835. |
| 7 | 13 | 14 | 0.39484E − 02 | 253.27 |
| 8 | 15 | 16 | 0.11095E − 03 | 9013.3 |
| 9 | 16 | 17 | −0.71074E − 02 | −140.70 |

TABLE 4-continued

| Element Number | | Surface Numbers | | lpp | l'pp |
|---|---|---|---|---|---|
| 10 | | 17 | 18 | 0.94167E − 03 | 1061.9 |
| 8 | 10 | 15 | 18 | −0.61289E − 02 | −163.16 |

| Element Number | | Surface Numbers | | lpp | l'pp |
|---|---|---|---|---|---|
| 1 | | | | −37.330 | −42.654 |
| 2 | | 3 | 4 | −19.052 | −25.885 |
| 3 | | 5 | 6 | 2.0973 | −14.593 |
| 4 | | 7 | 8 | 6.2468 | −6.2468 |
| 5 | | 9 | 10 | 0.79080 | −2.5057 |
| 6 | | 11 | 12 | −111.51 | −118.43 |
| 7 | | 13 | 14 | 1.8778 | −4.8526 |
| 8 | | 15 | 16 | 275.78 | 280.62 |
| 9 | | 16 | 17 | 0.27398E − 07 | −8.3916 |
| 10 | | 17 | 18 | 8.9457 | −0.23553E − 06 |
| 8 | 10 | 15 | 18 | −3.8740 | −25.497 |

TABLE 5

| Surf. No. | Type | Radius | Thickness | Glass | Clear Aperture Diameter |
|---|---|---|---|---|---|
| 1 | a | 118.1397 | 10.00000 | ACRYLIC | 105.09 |
| 2 | a | 138.7672 | 12.76842 | | 97.78 |
| 3 | a | −64.2610 | 9.00000 | ACRYLIC | 96.91 |
| 4 | a | −87.7383 | 1.00000 | | 94.28 |
| 5 | | 87.6633 | 30.00000 | SK18 | 103.10 |
| 6 | | −174.5638 | 0.30242 | | 101.32 |
| 7 | | −168.9595 | 6.00000 | SF6 | 101.26 |
| 8 | | 261.3135 | 1.00000 | | 97.53 |
| 9 | | 95.6146 | 20.66778 | SK5 | 96.96 |
| 10 | | −260.0801 | 1.00000 | | 96.12 |
| 11 | a | −730.9406 | 9.00000 | ACRYLIC | 94.26 |
| 12 | a | 395.7578 | 4.82062 | | 90.45 |
| 13 | a | 114.6574 | 10.00000 | ACRYLIC | 90.87 |
| 14 | a | 853.3167 | Space 1 | | 92.44 |
| 15 | a | −59.7301 | 5.60000 | ACRYLIC | 96.21 |
| 16 | | −58.5000 | 12.00000 | 430500 | 105.20 |
| 17 | | ∞ | 14.60000 | 565500 | 180.00 |
| 18 | | −600.0000 | Image distance | | 180.00 |

Symbol Description a - Polynomial asphere
Object and Image Surface

| Surface | Radius |
|---|---|
| Image | −599.9999 |

Even Polynomial Aspheres

| Surf. No. | D | E | F |
|---|---|---|---|
| 1 | −6.1424E − 07 | −1.2999E − 10 | −1.1135E − 13 |
| 2 | −5.5851E − 07 | −3.4414E − 10 | −1.1712E − 15 |
| 3 | 2.7572E − 06 | −1.7060E − 11 | −6.1786E − 14 |
| 4 | 2.5873E − 06 | 2.0009E − 11 | 9.8026E − 15 |
| 11 | 1.5098E − 06 | −1.5395E − 10 | 3.5089E − 14 |
| 12 | 2.4066E − 07 | 2.0670E − 10 | 5.5166E − 14 |
| 13 | −1.0005E − 06 | −6.5093E − 10 | 4.8030E − 13 |
| 14 | 4.8019E − 07 | 3.0152E − 10 | −1.2475E − 12 |
| 15 | −2.2995E − 06 | 1.5448E − 09 | −9.4063E − 13 |

| Surf. No. | G | H | I |
|---|---|---|---|
| 1 | 8.7573E − 18 | 2.1148E − 20 | −3.9525E − 24 |
| 2 | 2.8706E − 17 | 1.5666E − 20 | −4.9291E − 24 |
| 3 | 1.6863E − 17 | 4.2845E − 21 | −2.1224E − 24 |
| 4 | −2.9054E − 17 | −2.1846E − 21 | 1.4343E − 24 |
| 11 | 2.1688E − 17 | −1.6169E − 22 | −3.6426E − 24 |
| 12 | 3.1063E − 17 | 1.0689E − 20 | −5.7969E − 24 |
| 13 | −3.5518E − 16 | 1.6480E − 19 | −2.4355E − 23 |
| 14 | 9.6934E − 16 | −3.2272E − 19 | 4.3847E − 23 |
| 15 | 1.7519E − 16 | 5.4265E − 20 | −2.5406E − 23 |

TABLE 5-continued

Variable Spaces

| Zoom Pos. | Space 1 T(14) | Focal Shift | Image Distance |
|---|---|---|---|
| 1 | 42.527 | −0.300 | 0.000 |
| 2 | 43.133 | −0.584 | 0.000 |

First-Order Data

| | | |
|---|---|---|
| f/number | 1.22 | 1.23 |
| Magnification | −0.0931 | −0.1035 |
| Object Height | −1016.0 | −914.40 |
| Object Distance | −1194.7 | −1080.6 |
| Effective Focal Length | 101.87 | 101.46 |
| Image Distance | −.10580E − 03 | −.12529E − 03 |
| Overall Length | 1385.0 | 1271.5 |
| Forward Vertex Distance | 190.29 | 190.89 |
| Barrel Length | 190.29 | 190.89 |
| Stop Surface Number | 5 | 5 |
| Distance to Stop | 24.86 | 24.86 |
| Stop Diameter | 100.393 | 100.501 |
| Entrance Pupil Distance | 44.371 | 44.371 |
| Exit Pupil Distance | −80.781 | −81.051 |

First Order Properties of Elements

| Element Number | | Surface Numbers | | Power | f' |
|---|---|---|---|---|---|
| 1 | | 1 | 2 | 0.72085E − 03 | 1387.2 |
| 2 | | 3 | 4 | −0.17955E − 02 | −556.93 |
| 3 | | 5 | 6 | 0.10498E − 01 | 95.259 |
| 4 | | 7 | 8 | −0.79691E − 02 | −125.49 |
| 5 | | 9 | 10 | 0.82768E − 02 | 120.82 |
| 6 | | 11 | 12 | −0.19283E − 02 | −518.60 |
| 7 | | 13 | 14 | 0.37446E − 02 | 267.05 |
| 8 | | 15 | 16 | 0.43541E − 03 | 2296.7 |
| 9 | | 16 | 17 | −0.73504E − 02 | −136.05 |
| 10 | | 17 | 18 | 0.94167E − 03 | 1061.9 |
| 8 | 10 | 15 | 18 | −0.60528E − 02 | −165.21 |

| Element Number | | Surface Numbers | | lpp | l'pp |
|---|---|---|---|---|---|
| 1 | | | | −33.045 | −38.815 |
| 2 | | 3 | 4 | −18.884 | −25.784 |
| 3 | | 5 | 6 | 6.3964 | −12.737 |
| 4 | | 7 | 8 | 1.2917 | −1.9978 |
| 5 | | 9 | 10 | 3.5681 | −9.7055 |
| 6 | | 11 | 12 | 3.8984 | −2.1107 |
| 7 | | 13 | 14 | −1.0345 | −7.6991 |
| 8 | | 15 | 16 | 72.674 | 71.177 |
| 9 | | 16 | 17 | 0.24994E − 07 | −8.3916 |
| 10 | | 17 | 18 | 9.3291 | 0.52548E − 06 |
| 8 | 10 | 15 | 18 | −4.0041 | −26.032 |

TABLE 6

| Ex. No. | $f_o$ | $f_1$ | $f_2$ | fcr | $f_3$ | fp | ½ w |
|---|---|---|---|---|---|---|---|
| 1 | 76.68 | 511.00 | 67.32 | −677.81 | −164.11 | 85.89 | 38.0° |
| 2 | 75.97 | 735.15 | 72.59 | 464.15 | −113.80 | 81.53 | 38.0° |
| 3 | 78.32 | 310.32 | 97.32 | 397.14 | −157.17 | 79.09 | 38.0° |
| 4 | 100.80 | −1387.72 | 106.18 | 255.53 | −163.16 | 127.78 | 39.3° |
| 5 | 101.46 | −968.64 | 94.73 | 537.97 | −165.21 | 95.26 | 39.3° |

What is claimed is:

1. A projection television system comprising a cathode ray tube having a curved faceplate and a projection lens system for projecting light from the cathode ray tube onto a screen to form an image said projection lens system comprising in order from the system's image side:

(a) a first lens unit which primarily corrects aperture dependent aberrations, said first lens unit comprising at least one aspherical surface;

(b) a second lens unit having a positive optical power and comprising two positive lens elements and a negative lens element, one of said two positive lens elements being at the image side of the unit, said second lens unit providing color correction for the lens system;

(c) a corrector lens unit comprising at least one aspherical surface; and (d) a third lens unit which provides correction for the field curvature of the lens system;
wherein the positive lens element at the image side of the second lens unit is the strongest positive lens element of the projection lens system.

2. The projection television system of claim 1 wherein the two positive lens elements and the negative lens element of the second lens unit are each composed of glass.

3. The projection television system of claim 1 wherein the projection lens system has a focal length $f_0$, the first lens unit has a focal length $f_1$, the second lens unit has a focal length $f_2$, the corrector lens unit has a focal length $f_{CR}$, and the third lens unit has a focal length $f_3$, and wherein $f_0$, $f_1$, $f_2$, $f_{CR}$, and $f_3$ satisfy the following relationships:

$|f_1|/f_0 > 2.5$;
$f_2/f_0 < 1.5$;
$|f_{CR}|/f_0 > 2.0$; and
$|f_3|/f_0 < 2.5$.

4. The projection television system of claim 1 wherein the projection lens system has a focal length $f_0$ and the positive lens element at the image side of the second lens unit has a focal length $f_P$, and wherein $f_0$ and $f_P$ satisfy the following relationship:

$f_P/f_0 < 1.5$.

5. A projection television system comprising a cathode ray tube having a curved faceplate and a projection lens system for projecting light from the cathode ray tube onto a screen to form an image, said projection lens system comprising in order from the system's image side:

(a) a first lens unit which primarily corrects aperture dependent aberrations, said first lens unit comprising at least one aspherical surface;

(b) a second lens unit having a positive optical power and comprising two positive lens elements and a negative lens element, one of said two positive lens elements being at the image side of the unit, said second lens unit providing color correction for the lens system;

(c) a corrector lens unit comprising at least one aspherical surface; and (d) a third lens unit which provides correction for the field curvature of the lens system;
wherein the two positive lens elements and the negative lens element of the second lens unit are each composed of glass.

6. The projection television system of claim 5 wherein the projection lens system has a focal length $f_0$, the first lens unit has a focal length $f_1$, the second lens unit has a focal length $f_2$, the corrector lens unit has a focal length $f_{CR}$, and the third lens unit has a focal length $f_3$, and wherein $f_0$, $f_1$, $f_2$, $f_{CR}$, and $f_3$ satisfy the following relationships:

$|f_1|/f_0 > 2.5$;
$f_2/f_0 < 1.5$;
$|f_{CR}|/f_0 > 2.0$; and
$|f_3|/f_0 < 2.5$.

7. The projection television system of claim 5 wherein the projection lens system has a focal length $f_0$ and the positive lens element at the image side of the second lens unit has a focal length $f_P$, and wherein $f_0$ and $f_P$ satisfy the following relationship:

$f_P/f_0 < 1.5$.

* * * * *